(12) United States Patent
Gal

(10) Patent No.: US 7,641,717 B2
(45) Date of Patent: Jan. 5, 2010

(54) ULTRA CLEANING OF COMBUSTION GAS INCLUDING THE REMOVAL OF $CO_2$

(75) Inventor: Eli Gal, Cupertino, CA (US)

(73) Assignee: EIG, Inc., Cupertino, CA (US)

( * ) Notice: Subject to any disclaimer, the term of this patent is extended or adjusted under 35 U.S.C. 154(b) by 309 days.

(21) Appl. No.: 11/632,537

(22) PCT Filed: Apr. 12, 2005

(86) PCT No.: PCT/US2005/012794

§ 371 (c)(1),
(2), (4) Date: Jan. 16, 2007

(87) PCT Pub. No.: WO2006/022885

PCT Pub. Date: Mar. 2, 2006

(65) Prior Publication Data

US 2008/0072762 A1   Mar. 27, 2008

(51) Int. Cl.
*B01D 53/14* (2006.01)
(52) U.S. Cl. .............................. 95/187; 95/229; 95/236; 423/234; 96/242
(58) Field of Classification Search .................. 96/234, 96/242; 95/187, 199, 223, 225, 229, 236; 423/220, 234
See application file for complete search history.

(56) References Cited

U.S. PATENT DOCUMENTS

| | | | |
|---|---|---|---|
| 2,043,109 | A | 6/1936 | McKee et al. |
| 2,106,734 | A | 2/1938 | Gollmar |
| 2,878,099 | A | 3/1959 | Breuing et al. |
| 4,515,760 | A | 5/1985 | Lang et al. |
| 4,847,057 | A | 7/1989 | Brugerolle et al. |
| 4,977,745 | A | 12/1990 | Heichberger |
| 4,999,031 | A | 3/1991 | Gerhardt et al. |
| 5,067,972 | A | 11/1991 | Hemmings et al. |

(Continued)

FOREIGN PATENT DOCUMENTS

AU           648129           7/1992

(Continued)

OTHER PUBLICATIONS

PCT International Search Report (PCT/US2005/012794).

(Continued)

*Primary Examiner*—Frank M Lawrence
(74) *Attorney, Agent, or Firm*—Timothy J. Olson

(57) ABSTRACT

Ultra cleaning of combustion gas to near zero concentration of residual contaminants followed by the capture of $CO_2$ is provided. The high removal efficiency of residual contaminants is accomplished by direct contact cooling and scrubbing of the gas with cold water. The temperature of the combustion gas is reduced to 0-20 degrees Celsius to achieve maximum condensation and gas cleaning effect. The $CO_2$ is captured from the cooled and clean flue gas in a $CO_2$ absorber (134) utilizing an ammoniated solution or slurry in the $NH_3$—$CO_2$,$H_2O$ system. The absorber operates at 0-20 degrees Celsius. Regeneration is accomplished by elevating the pressure and temperature of the $CO_2$-rich solution from the absorber. The $CO_2$ vapor pressure is high and a pressurized $CO_2$ stream, with low concentration of $NH_3$ and water vapor is generated. The high pressure $CO_2$ stream is cooled and washed to recover the ammonia and moisture from the gas.

32 Claims, 3 Drawing Sheets

U.S. PATENT DOCUMENTS

| | | | |
|---|---|---|---|
| 5,137,550 A | 8/1992 | Hegarty et al. |
| 5,186,916 A | 2/1993 | Nevels |
| 5,318,758 A | 6/1994 | Fujii et al. |
| 5,378,442 A | 1/1995 | Fujii et al. |
| 5,427,759 A | 6/1995 | Heitmann |
| 5,453,115 A | 9/1995 | Vuletić |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 * | 8/2007 | Yeh et al. ............ 423/234 |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Craig et al. |
| 2006/0204425 A1 | 9/2006 | Kamijo et al. |
| 2007/0006565 A1 | 1/2007 | Fleischer et al. |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002/300888 | 6/2003 |
| AU | 2002/300893 | 6/2003 |
| AU | 2002325051 | 4/2004 |
| AU | 2002348259 | 6/2004 |
| DE | 2832493 | 7/1978 |
| DE | 3633690 | 4/1988 |
| EP | 0243778 | 11/1987 |
| EP | 0588178 | 3/1994 |
| EP | 1759756 | 3/2007 |
| GB | 271852 | 5/1926 |
| GB | 899611 | 6/1962 |
| GB | 2331526 | 5/1999 |
| SU | 512785 | 5/1976 |
| SU | 1567251 | 5/1990 |
| WO | 98/47604 | 10/1998 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |

OTHER PUBLICATIONS

Schussler et al., "Carbon Dioxide Removal from Fossil Fuel Power Plants by Refrigeration Under Pressure," IEEE, 1989.

Resnik et al., "Aqua Ammonia Process for Simultaneous Removal of $CO_2$, $SO_2$ and $NO_x$," Int. J. Environmental Tech. and Management, May 31, 2004 (approx.), pp. 89-104, vol. 4, Nos. 1/2.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Excerpt from U.S. Appl. No. 10/644,950, pp. 1-22 (S-99,117).

A.C. Yeh, H. Bai: "Comparison of ammonia and monoethanolamine solvents to reduce $CO_2$ greenhouse gas emissions" The Science of the Total Environment, vol. 338, 1999, pp. 121-133, XP002529608.

European Search Report ( EP05735524) dated Jun. 16, 2009.

\* cited by examiner

ULTRA CLEANING OF COMBUSTION GAS INCLUDING THE REMOVAL OF CO$_2$

FIELD OF THE INVENTION

The present invention relates to systems and methods for ultra cleaning of combustion gas followed by the capture and regeneration of CO$_2$.

BACKGROUND

Most of the energy used in the world today is derived from the combustion of carbon and hydrogen containing fuels such as coal, oil and natural gas. In addition to carbon and hydrogen, these fuels contain oxygen, moisture and contaminants such as ash, sulfur, nitrogen compounds, chlorine, mercury and other trace elements. Awareness to the damaging effects of the contaminants released during combustion triggers the enforcement of ever more stringent limits on emissions from power plants, refineries and other industrial processes. There is an increased pressure on operators of such plants to achieve near zero emission of contaminants and to reduce CO$_2$ emission.

The art teaches various processes and technologies designed to reduce the emission of contaminants from combustion gases. Baghouses, electrostatic precipitators and wet scrubbers are typically used to capture particulate matter, various chemical processes are used to reduce sulfur oxides, HCl and HF emissions, combustion modifications and NO$_x$ reduction processes are used to reduce NO$_x$ emission and processes are being developed to capture mercury and other trace elements from combustion gas.

Significant progress has been made in the last 20-30 years and plants today are a lot cleaner and safer to the environment than in the past. However, there are growing indications that even small concentration of particulate matter and especially the very fine, less than 2.5 micron size particles (PM2.5), sulfur oxides, acid mist and mercury are harmful to human health and need to be controlled.

Controlling the residual emission is still a challenge and with existing technologies the cost of capturing the last few percents of harmful contaminants is very high.

In addition, in the last few years, there is a growing concern related to the accumulation of CO$_2$, a greenhouse gas, in the atmosphere. The accelerated increase of CO$_2$ concentration in the atmosphere is attributed to the growing use of fuels, such as coal, oil and gas, which release billions of tons of CO$_2$ to the atmosphere every year.

Reduction in CO$_2$ emission can be achieved by improving efficiency of energy utilization, by switching to lower carbon concentration fuels and by using alternative, CO$_2$ neutral, energy sources. However, short of a major breakthrough in energy technology, CO$_2$ emitting fuels will continue to be the main source of energy in the foreseeable future. Consequently, a low cost low energy consuming process for capturing and sequestering CO$_2$ is needed to reverse the trend of global warming.

State of the art technologies for capturing CO$_2$ are not suitable for operation with dirty, low pressure, low CO$_2$ concentration, and oxygen containing combustion gases. Available commercial technologies for CO$_2$ capture are energy intensive and high cost. If applied they would impose a heavy toll on the cost of energy utilization.

An applicable process currently available for post combustion CO$_2$ capture is the amine process using Mono-Ethanol-Amine (MEA) or similar amines to react with CO$_2$. The MEA process is capable of achieving high capture efficiency and of generating a concentrated CO$_2$ stream for sequestration. However, the process has several drawbacks including:

The MEA reagent is expensive and degrades in oxygen and CO$_2$ environment.

The MEA is corrosive and can be used only in a relatively diluted form.

The reaction of MEA with CO$_2$ is highly exothermic.

Regeneration is energy intensive.

The process is a large consumer of heat and auxiliary power.

The cost of the amine process and system is very high and the net power output of a power plant equipped with amine system to capture CO$_2$ is greatly reduced.

To achieve clean burning of fuels with near zero emission, including the emission of CO$_2$, there is a need for a low cost low energy process that:

Captures residual contaminants

Captures CO$_2$ and releases it in a concentrated and high pressure form for sequestration.

Accordingly, it would be considered an advance in the art to develop new systems and methods to overcome the current problems and shortcomings.

SUMMARY OF THE INVENTION

The present invention is an integrated method and system to efficiently and cost effectively reduce the emission of residuals, such as SO$_2$, SO$_3$, HCl, HF and particulate matter including PM2.5, from combustion gas, downstream of conventional air pollution control systems, to near zero levels. Further, the system of the current invention reduces CO$_2$ emission by capturing and delivering it to sequestration in a concentrated form and at high pressure. It is the objective of this invention that the process would be relatively uncomplicated, would utilize low cost reagent, would generate no additional waste streams and most importantly, would be a low cost and low energy consumer.

The present invention is a wet method and system whereby the saturated combustion gas, downstream of conventional air pollution control equipment and system, is cooled to well below its ambient saturation temperature. The cooling is achieved by direct contact with cold water in dedicated vessels. The direct contact between the gas and the liquid, combining with massive condensation of moisture from the saturated gas, is a very efficient wet scrubber. Optionally, alkaline materials such as sodium or ammonium carbonate can be added to the direct contact cooler to enhance the capture of the acidic species in the gas. The direct cooling to low temperature can be achieved in one or more cooling stages. Continuous bleed from the direct contact cooler, prevents the accumulation of the captured contaminants in the direct contact coolers.

In a preferred embodiment, the chilled water will be generated in cooling towers with additional cooling, to low temperature in the range of 0-20, or even 0-10, degrees Celsius, by efficient mechanical vapor compression where the water itself is used as the refrigerant.

In accordance with the current invention, cooling of the gas substantially reduces its moisture content. The cooled and low moisture gas has relatively low volume and relatively high CO$_2$ concentration thus making the efficient capture of CO$_2$ easier and lower cost.

The invention further involves the mass transfer and the reaction of gaseous CO$_2$ from the combustion gas with CO$_2$-lean ammoniated solution to form CO$_2$-rich ammoniated solution. According to the current invention, the absorption reaction occurs in a CO$_2$ absorber operating at about atmospheric pressure and at low temperature preferably in the temperature range of 0-20, or even 0-10, degrees Celsius. The low temperature enhances mass transfer of $CO_2$ to the solution while substantially reducing the vapor pressure of ammonia and preventing its evaporation into the gas stream. One or more stages of $CO_2$ absorption can be used depending on the capture efficiency requirements.

Further, in accordance with the current invention, the pressure of the $CO_2$-rich solution from the $CO_2$ absorber is elevated by high-pressure pump to the range of 30-2000 psi and it is heated to the temperature range of 50-200 degrees Celsius and preferably to the temperature range of 100-150 degrees Celsius. Under the conditions above the $CO_2$ separates from the solution and evolves as a relatively clean and high-pressure gas stream. The high pressure $CO_2$ gas stream contains low concentration of ammonia and water vapor, which can be recovered by cold washing of the $CO_2$ gas steam.

The regeneration reaction is endothermic. However, the heat of reaction is low and the overall heat consumption of the process is relatively low. Moreover, the high-pressure regeneration minimizes the evaporation of ammonia and water thus minimizing the energy consumed in the process. Also, low-grade heat can be used for the regeneration of the $CO_2$ to further reduce the impact of the $CO_2$ capture on the overall efficiency of the plant. The $CO_2$-lean solution used in the absorber to capture the $CO_2$ contains $NH_3/CO_2$ mole ratio in the range of 1.5-4.0 and preferably in the range of 1.5-3.0. The $CO_2$-rich solution sent for regeneration contains $NH_3/CO_2$ mole ratio in the range of 1.0-2.0 and preferably in the range of 1.0-1.5.

The present invention has the advantage of high efficiency low cost capture of residual contaminants from the combustion gas followed by high efficiency low cost capture and regeneration of $CO_2$. Low temperature absorption and high-pressure regeneration are critical to successful operation of the process and system. The simple, low cost and efficient system has notable advantage over other cleaning and $CO_2$ capturing processes and it is a real breakthrough in achieving the objective of near zero emission of contaminants.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
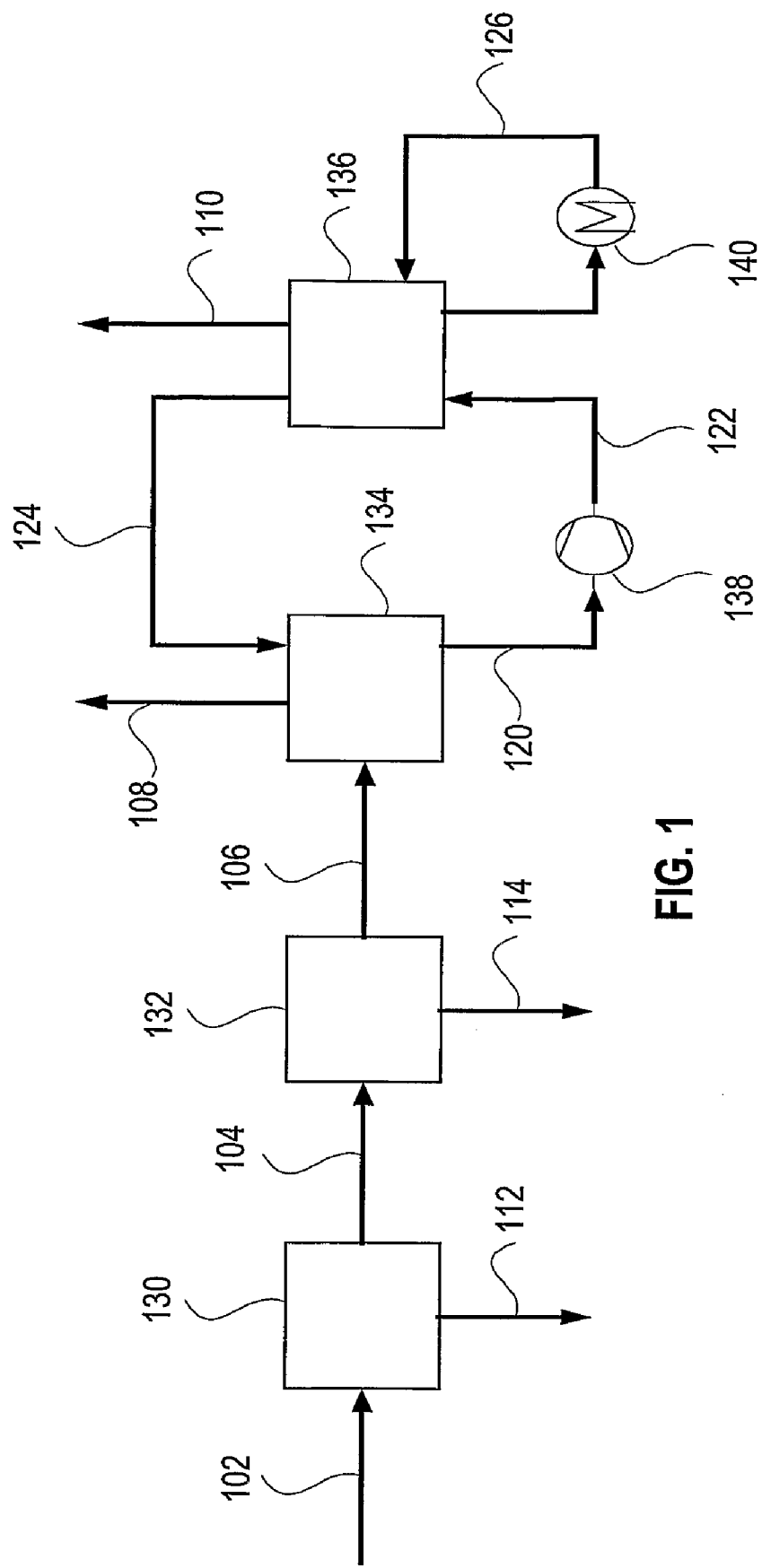
FIG. 1 is a schematic representation of the integrated system to capture residual contaminants and $CO_2$ from combustion gas downstream of conventional air pollution control systems. The system includes gas cleaning, $CO_2$ absorption and $CO_2$ regeneration.

In accordance with the present invention, a process and system to remove most contaminants, including $CO_2$, from gas streams is provided. These gases are typically resulting from the combustion or gasification of coal, liquid fuels, gaseous fuels and organic waste materials. The contaminants include residual of e.g. $SO_2$, $SO_3$, HCl, HF, $CO_2$, particulate matter including PM2.5, mercury and other volatile matter.

The high removal efficiency of the contaminants is achieved by saturation and efficient cooling of the gas to below its adiabatic saturation temperature and preferably to as low as 0-20, or even 0-10, degrees Celsius. Fine particles and acid mist are nucleation sites for the condensation of water. Thus, practically all fine particles and acid mist are removed from the gas stream. The low temperature creates an environment of low vapor pressure of $SO_2$, $SO_3$, HCl, HF, Mercury and other volatile matter, which condense into the cold water as well.

The cooling of the flue gas enables the efficient capture of $CO_2$ in $CO_2$-lean ammoniated solution or slurry. Absorption of the $CO_2$ is achieved at low temperature preferably at as low as 0-20 degrees Celsius or at as low as 0-10 degrees Celsius. The absorbent is regenerated by elevating the temperature of the solution or slurry to the range of 50-200 degrees Celsius and to pressures in the range of 30-2000 psig. The low temperature of absorption and the high pressure of regeneration result in high $CO_2$ capture efficiency, low energy consumption and low loss of ammonia through evaporation.

The $CO_2$ absorption takes place in the aqueous $NH_3$—$CO_2$—$H_2O$ system where the ammonia can be in the form of ammonium ion, $NH_4^+$, or in the form of dissolved molecular $NH_3$. The $CO_2$ can be in the form of carbonate, $CO_3^=$, bicarbonate, $HCO_3^-$ or in the form of dissolved molecular $CO_2$. The capacity of the solution to absorb $CO_2$ and the form in which the species are present depends on the ammonia concentration, on the $NH_3/CO_2$ mole ratio and on the temperature and pressure.

High $NH_3/CO_2$ mole ratio increases the vapor pressure of ammonia and results in ammonia losses through evaporation. Low $NH_3/CO_2$ ratio increases the vapor pressure of $CO_2$ and decreases its capture efficiency. Thus, the optimal $NH_3/CO_2$ mole ratio for absorption is in the range of 1.0-4.0 and preferably in the range of 1.5 to 3.0. High temperature increases the vapor pressure of both ammonia and $CO_2$. As a result, the absorber should operate at the lowest practical temperature and preferably in the 0-20 degrees Celsius temperature range or even in the 0-10 degrees Celsius temperature range.

At high concentration and lower temperature the solubility limits may be reached and solids particles precipitate. These solids particles are typically in the form of ammonium carbonate $(NH_4)_2CO_3$ for high $NH_3/CO_2$ ratio and ammonium bicarbonate $NH_4HCO_3$ for low $NH_3/CO_2$ ratio.

The mass transfer and absorption reactions for concentrated low temperature slurries are the following:

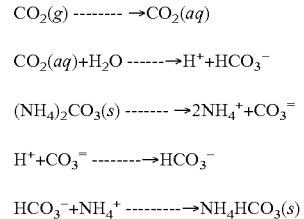

Where $CO_2$ captured from the gas converts ammonium carbonate to ammonium bicarbonate. The reactions above are reversible and $CO_2$ is stripped from the liquid phase at elevated temperature.

Depending on the operating conditions, side undesired reactions may occur such as:

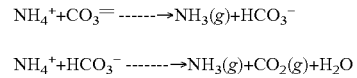

Causing emission of $NH_3$ into the gas phase. Lower temperature and lower $NH_3/CO_2$ ratio in the absorber suppresses these undesired reactions. However, during the regeneration and at elevated temperature, gaseous ammonia is formed. To prevent ammonia from escaping from the liquid phase (and for other reasons) the regenerator is deigned to operate under elevated pressure and under conditions where the solubility of ammonia in the solution is very high and the emission of gaseous ammonia is very low.

FIG. 1 is a schematic representation of the integrated process, which includes cleaning and cooling of the gas, $CO_2$ absorption into $CO_2$-lean ammoniated solution and $CO_2$ regeneration from the $CO_2$-rich solution. Stream 102 is a gas stream from combustion or industrial process containing residual contaminants, $CO_2$ and inert gas species. The $CO_2$ concentration of the gas is typically 10-15% for coal combustion and 3-4% for natural gas combustion. Subsystem 130 represents a series of conventional air pollution control processes which, depending on the source of the gas may include particulate collectors, $NO_x$ and $SO_2$ control, acid mist capturing device and more. The contaminants collected in the system are removed in stream 112. Stream 104, downstream of the conventional cleaning devices, contains residual contaminants not collected by the conventional systems. It is typically water saturated and in the temperature range of 40-70 degrees Celsius. Subsystem 132 is a series of one or more Direct Contact Coolers (DCC), where cold water generated in cooling towers and chillers (not shown) is used to wash and scrub the gas, capture its residual contaminants and lower its moisture content. Stream 114, is a bleed from subsystem 132 designed to purge all the residual contaminants captured.

Stream 106 is a cooled gas suitable for $CO_2$ capture in the $CO_2$ absorber. Subsystem 134 represents the $CO_2$ absorber and may comprise of a series of absorber stages, depending on the removal efficiency required and the operating conditions of the plant. The clean gas with low $CO_2$ concentration, stream 108, is released to the atmosphere. Stream 124 is a cooled $CO_2$-lean ammoniated solution from the regenerator, subsystem 136, which is used as the absorbent to capture the $CO_2$ in the absorber. The resultant stream 120 is a $CO_2$-rich ammoniated solution sent for regeneration.

The regenerator, subsystem 136, operates at high pressure and elevated temperature and may be a single or a series of regeneration reactors. The pressure of the ammoniated solution fed to the regenerator is elevated using high pressure pump, pump 138, to yield stream 122 which is $CO_2$-rich and at high pressure. Typically, the pressure of stream 122 is in the range of 50-2500 psi, higher than the regenerator pressure to prevent premature evaporation of $CO_2$. Heat is provided to the regenerator by heating stream 126 in heater 140. The high pressure and high temperature in the regenerator cause the release of high-pressure gaseous $CO_2$, stream 110. The high-pressure regeneration has major cost and energy advantage. Low quality thermal energy is used to generate the high pressure $CO_2$ stream instead of high-value electric power.

Figure 2:
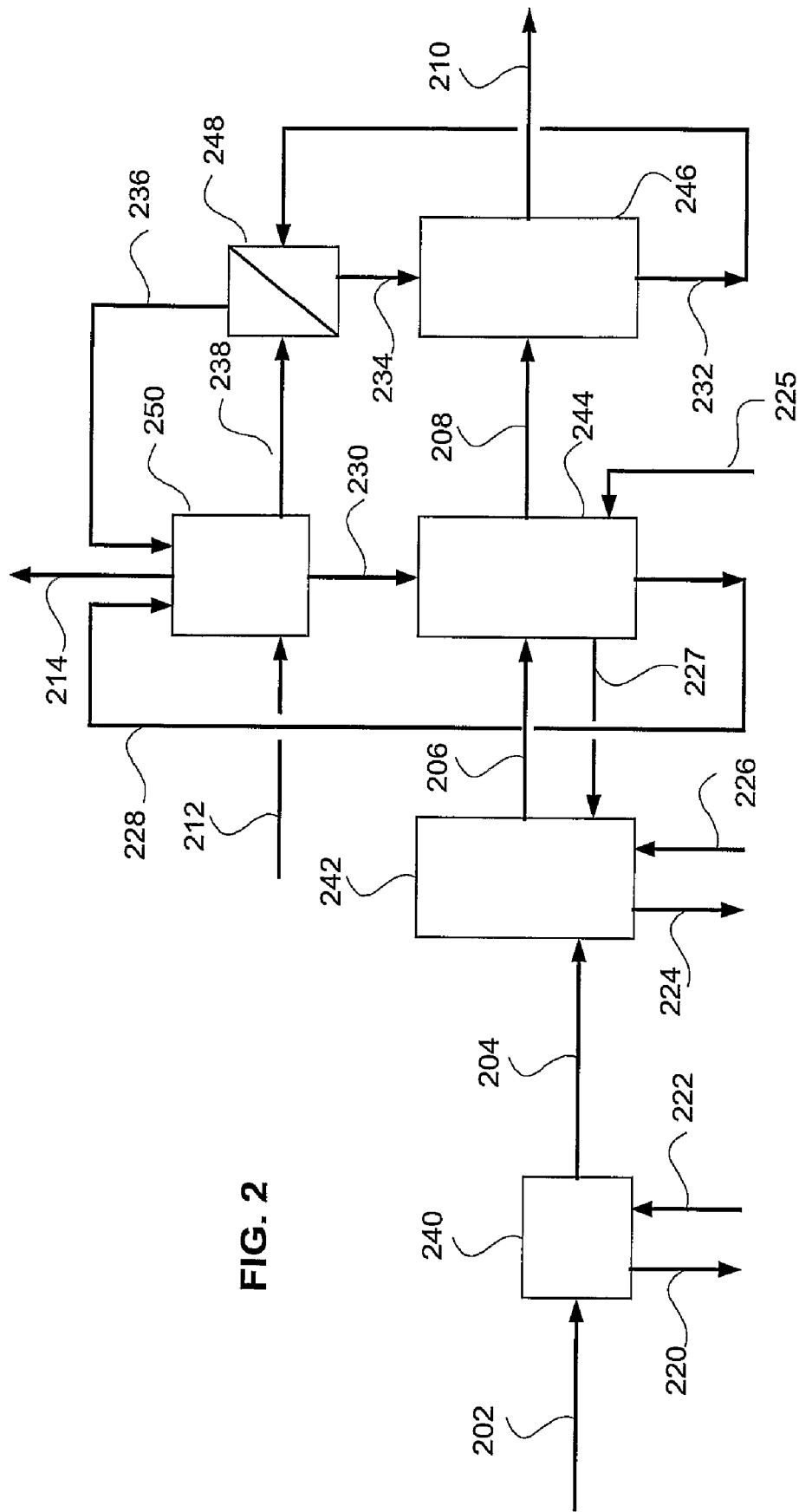
FIG. 2 is a schematic of the subsystems for the cooling of the gas and for deep cleaning of residual contaminants.

FIG. 2 is a schematic representation of the cooling and cleaning subsystems, which may optionally include waste heat recovery, heat exchanger 240, for utilization of the residual heat in the gas. The residual heat in stream 202 can be extracted in heat exchanger 240 by transferring of the heat to a cooling medium streams 220 and 222. The heat can then be used downstream for $CO_2$ regeneration.

Vessel 242 is a wet direct contact scrubber used to adiabatically cool and saturate the gas. If the gas contains high concentration of acid species, such as gas from coal or oil fired power plants, then reactor 242 is used for flue gas desulfurization. Acid absorbing reagent, such as limestone, stream 226, is added to vessel 242 and the product, such as gypsum, stream 224, is withdrawn. Make up water, stream 227, is added to vessel 242 from the Direct Contact Cooler (DCC) 244. The make up stream contains all the contaminants collected in the direct contact coolers. These contaminants are removed from the system with the discharge stream 224. Gas stream 202 in coal fired boiler is typically at temperature in the range of 100-200 degrees Celsius, gas stream 204 is typically at temperature range of 80-100 degrees Celsius and gas stream 206 is typically water-saturated and at temperature range of 40-70 degrees Celsius.

Two stages of direct contact cooling and cleaning, vessels 244 and 246, are shown in FIG. 2. The actual number of direct contact coolers may be higher and it depends on optimization between capital cost, energy efficiency and cleaning efficiency requirements.

Gas stream 206 is cooled in DCC 244 to just above the cooling water temperature of stream 230. The temperature of the cooling water, stream 230, depends on the ambient conditions and on the operation and process conditions of Cooling Tower 250. Cooling Tower 250 can be of the wet type with temperature slightly below or slightly above ambient temperature, or the dry type with temperature above ambient temperature. Ambient air, Stream 212 provides the heat sink for the system and the heat is rejected in Stream 214, which absorbs the heat from water stream 228. The resultant cooled water stream 230, is typically at temperature range of 25-40 degrees Celsius and the resultant cooled combustion gas stream from DCC 244 is at about 1-3 degrees Celsius higher temperature. Alkaline materials such as ammonium or sodium carbonate can be added to DCC 244 to neutralize the acidic species captured. The alkaline materials can be added in makeup water, stream 225.

The cleaner and lower temperature, Stream 208 flows to DCC 246, which is similar to DCC 244 except for the fact that colder water, stream 234, is used for cooling. Stream 234 is a chilled water stream cooled by Chiller 248, which is preferably a mechanical vapor compression machine with water as its refrigerant. Heat from Chiller 248 is rejected via stream 236 to Cooling Tower 250 with returning stream 238. Cooling water stream 234 can be as cold as 0-3 degrees Celsius or higher resulting in combustion gas temperature, stream 210, exiting DCC 246 being at 0-10 degrees Celsius temperature or few degrees higher. The heat absorbed from the gas stream is removed from DCC 246 via water stream 232. More condensation occurs in DCC 246 and further capture of contaminants. These contaminants are bled from the system to vessel 242. (Bleed stream is not shown).

Gas Stream 210, the product of the cooling and cleaning subsystem shown in FIG. 2, is at low temperature; it contains low moisture and practically has no particulate matter, acidic or volatile species.

Figure 3:
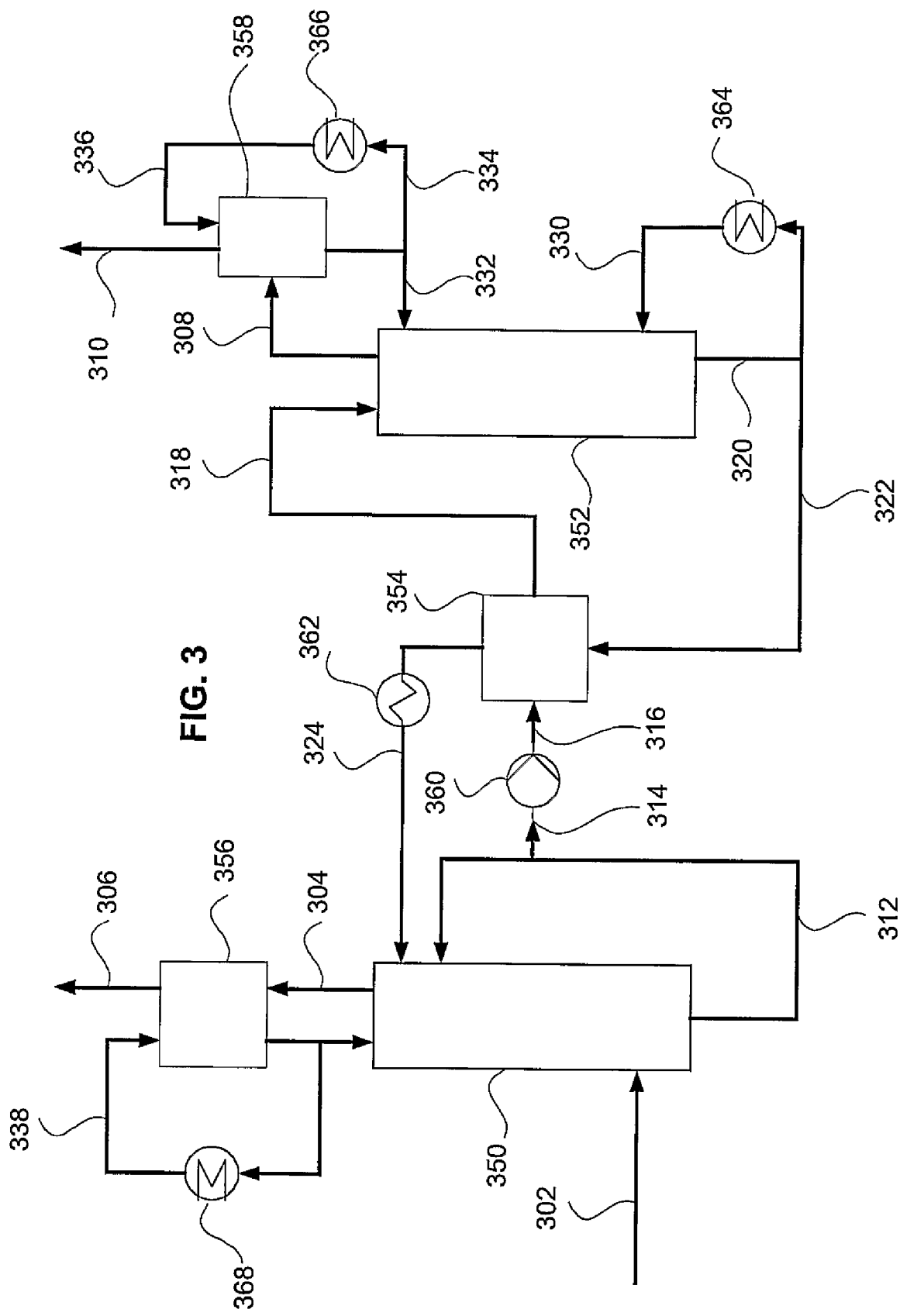
FIG. 3 is a schematic of the $CO_2$ capture and regeneration subsystems. It includes $CO_2$ absorber which operates at low temperature and $CO_2$ regenerator which operates at moderate temperature and at high pressure.

FIG. 3 is a schematic representation of the $CO_2$ capture and regeneration subsystem. Stream 302 is a clean and cooled gas stream, similar to stream 210 in FIG. 2. It flows into the $CO_2$ absorber 350, where the $CO_2$ is absorbed by a cooled $CO_2$-lean ammoniated solution or slurry, Stream 324 containing $NH_3/CO_2$ mole ratio in the range of 1.5-4.0 and preferably 1.5-3.0. Depending on the absorber design and the number of absorption stages used, more than 90% of the $CO_2$ in Stream 302 can be captured to yield a cold and $CO_2$ depleted gas stream 304. Residual ammonia in stream 304 can be washed in vessel 356 by cold water or by cold and slightly acidic solution, stream 338. Stream 338 is cooled in heat exchanger 368. As a result of the cooling, cleaning and $CO_2$ capture, the gas stream discharged from the system, Stream 306, contains mainly nitrogen, oxygen and low concentration of $CO_2$ and $H_2O$.

Stream 324 is a $CO_2$-lean stream from the regenerator, which is cooled in the regenerative heat exchanger 354 and further by chilled water in heat exchanger 362. It captures $CO_2$ in absorber 350 and discharges from the absorber, Stream 312, as a $CO_2$-rich stream with $NH_3/CO_2$ mole ratio in the range of 1.0-2.0 and preferably with $NH_3/CO_2$ mole ratio in the range of 1.0-1.5. In a preferred embodiment, stream 312 contains high concentration of dissolved and suspended ammonium bicarbonate. A portion of stream 312 is optionally recycled back to the absorber while the balance, Stream 314, is pressurized in high pressure pump 360 to yield high pressure ammoniated solution stream 316. Stream 316 is heated in regenerative heat exchanger 354, by exchanging heat with the hot and $CO_2$-lean stream from the regenerator, stream 322, which is a portion of stream 320 discharged at the bottom of regenerator 352.

The $CO_2$-rich stream from the regenerative heat exchanger 354, stream 318, can be further heated with waste heat from the boiler or from other sources. It flows into the regenerator 352, which has one or more stages of regeneration. More heat is provided to the regenerator from heat exchanger 364, which heats stream 330. The heat provided to the system from the various sources, elevates the regenerator temperature to 50-150 degrees Celsius or higher, depending on the desired pressure of the $CO_2$ stream 308 and subject to cost optimization consideration. The higher the temperature the higher will be the pressure of the $CO_2$ that evolves from the solution, stream 308. The higher the pressure the lower will be the ammonia and water vapor content of stream 308. To generate low temperature and highly concentrated $CO_2$ stream, stream 308 is washed and cooled in direct contact vessel 358 with cold water, stream 336 from heat exchanger 366. Excess water and $NH_3$ captured in vessel 358, stream 332, flows back to regenerator 352 while the balance, stream 334, is cooled and recycled to the wash chamber, vessel 358.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations and other variations are considered to be within the scope and spirit of the present invention as defined by the following claims and their legal equivalents.

What is claimed is:

1. A system for cleaning of a contaminated combustion gas, comprising:
    (a) one or more direct and wet cooling stages configured to cool a gas stream to condense water from said gas stream and to capture and remove contaminants from said gas stream, wherein the one or more direct and wet cooling stages includes a final cooling stage configured to cool the gas stream to below ambient temperature;
    (b) one or more $CO_2$ absorbing stages configured to absorb $CO_2$ from the gas stream cooled to below ambient temperature using an ammoniated solution or slurry;
    (c) a pressurizer configured to pressurize the ammoniated solution or slurry with the absorbed $CO_2$; and
    (d) one or more $CO_2$ regeneration stages configured to separate absorbed $CO_2$ from said pressurized ammoniated solution or slurry.

2. The system as set forth in claim 1, wherein said final cooling stage is further configured to cool said gas stream to about 0-20 degrees Celsius.

3. The system as set forth in claim 1, wherein said final cooling stage is further configured to cool said gas stream to about 0-10 degrees Celsius.

4. The system as set forth in claim 1, wherein the one or more $CO_2$ absorbing stages are further configured to absorb said $CO_2$ using a $CO_2$-lean $NH_3$—$CO_2$—$H_2O$ solution or slurry.

5. The system as set forth in claim 4, wherein said $CO_2$-lean solution or slurry has a $NH_3/CO_2$ mole ratio in the range of 1.5-4.0.

6. The system as set forth in claim 4, wherein said $CO_2$-lean solution or slurry has a $NH_3/CO_2$ mole ratio in the range of 1.5-3.0.

7. The system as set forth in claim 1, wherein said one or more $CO_2$ absorbing stages are further configured to operate at a temperature in the range of 0-20 degrees Celsius.

8. The system as set forth in claim 1, wherein said one or more $CO_2$ absorbing stages are further configured to operate at a temperature in the range of 0-10 degrees Celsius.

9. The system as set forth in claim 1, wherein said one or more $CO_2$ absorbing stages are further configured to absorb $CO_2$ so as to generate a $CO_2$-rich $NH_3$—$CO_2$—$H_2O$ solution.

10. The system as set forth in claim 9, wherein said $CO_2$-rich solution has a $NH_3/CO_2$ mole ratio in the range of 1.0-2.0.

11. The system as set forth in claim 9, wherein said $CO_2$-rich solution has a $NH_3/CO_2$ mole ratio in the range of 1.0-1.5.

12. The system as set forth in claim 1, further comprising:
    a heater configured to heat the ammoniated solution or slurry with the absorbed $CO_2$ to a temperature in the range of 50-200 degrees Celsius;
    wherein the one or more $CO_2$ regeneration stages are further configured to separate absorbed $CO_2$ from said pressurized and heated ammoniated solution or slurry.

13. The system as set forth in claim 1, further comprising:
    a heater configured to heat the ammoniated solution or slurry with the absorbed $CO_2$ to a temperature in the range of 100-150 degrees Celsius;
    wherein the one or more $CO_2$ regeneration stages are further configured to separate absorbed $CO_2$ from said pressurized and heated ammoniated solution or slurry.

14. The system as set forth in claim 1, wherein said pressurizer is further configured to pressurize the ammoniated solution or slurry to a pressure in the range of 30-2000 psi.

15. The system as set forth in claim 1, wherein said pressurizer is further configured to pressurize the ammoniated solution or slurry to a pressure in the range of 150-400 psi.

16. A method for cleaning of a contaminated combustion gas, comprising:
    (a) cooling down a gas stream to condense water from said gas stream and to capture and remove contaminants from said gas stream, wherein the gas stream is cooled to below ambient temperature;
    (b) absorbing $CO_2$ from said cooled gas stream using an ammoniated solution or slurry, wherein the cooled gas stream and ammoniated solution or slurry are maintained below ambient temperature during said absorbing;
    (c) pressurizing the ammoniated solution or slurry with the absorbed $CO_2$; and
    (d) regenerating $CO_2$ by separating $CO_2$ from said pressurized ammoniated solution or slurry.

17. The method as set forth in claim 16, wherein said gas stream is cooled to a temperature in the range of 0-20 degrees Celsius.

18. The method as set forth in claim 16, wherein said gas stream is cooled to a temperature in the range of 0-10 degrees Celsius.

19. The method as set forth in claim 16, wherein the ammoniated solution or slurry used to absorb said $CO_2$ is a $CO_2$ lean $NH_3$—$CO_2$—$H_2O$ solution or slurry.

20. The method as set forth in claim 19, wherein said $CO_2$-lean solution or slurry has a $NH_3/CO_2$ mole ratio in the range of 1.5-4.0.

21. The method as set forth in claim 19, wherein said $CO_2$-lean solution or slurry has a $NH_3/CO_2$ mole ratio in the range of 1.5-3.0.

22. The method as set forth in claim 19, wherein said $NH_3$—$CO_2$—$H_2O$ solution or slurry is in water-dissolved form.

23. The method as set forth in claim 19, wherein the species in said $NH_3$—$CO_2$—$H_2O$ solution or slurry are concentrated such to contain dissolved and suspended solids having ammonium carbonate, $(NH_4)_2CO_3$, and ammonium bicarbonate, $NH_4HCO_3$, salts.

24. The method as set forth in claim 16, wherein the cooled gas stream and ammoniated solution or slurry maintained at a temperature in the range of 0-20 degrees Celsius during said absorbing.

25. The method as set forth in claim 16, wherein the cooled gas stream and ammoniated or slurry are maintained at a temperature in the range of 0-10 degrees Celsius during said absorbing.

26. The method as set forth in claim 16, wherein said ammoniated solution or slurry with the absorbed $CO_2$ is a $CO_2$-rich $NH_3$—$CO_2$—$H_2O$ solution.

27. The method as set forth in claim 26, wherein said $CO_2$-rich solution has a $NH_3/CO_2$ mole ratio in the range of 1.0-2.0.

28. The method as set forth in claim 26, wherein said $CO_2$-rich solution has a $NH_3/CO_2$ mole ratio in the range of 1.0-1.5.

29. The method as set forth in claim 16, further comprising:
heating the ammoniated solution or slurry with the absorbed $CO_2$ to a temperature in the range of 50-200 degrees Celsius;
wherein the pressurized ammoniated solution or slurry from which $CO_2$ is separated to regenerate $CO_2$ is the pressurized and heated ammoniated solution or slurry.

30. The method as set forth in claim 16, further comprising:
heating the pressurized ammoniated solution or slurry with the absorbed $CO_2$ to a temperature in the range of 100-150 degrees Celsius;
wherein the pressurized ammoniated solution or slurry from which $CO_2$ is separated to regenerate $CO_2$ is the pressurized and heated ammoniated solution or slurry.

31. The method as set forth in claim 16, wherein the ammoniated solution or slurry with the absorbed $CO_2$ is pressurized to a pressure in the range of 30-2000 psi.

32. The method as set forth in claim 16, wherein the ammoniated solution or slurry with the absorbed $CO_2$ is pressurized to a pressure in the range of 150-400 psi.

* * * * *